United States Patent [19]

Schnur et al.

[11] 3,988,117

[45] Oct. 26, 1976

[54] REACTOR FOR THE PRODUCTION OF OXYGEN CONTAINING COMPOUNDS

[75] Inventors: Friedrich Schnur; Josef Hibbel, both of Oberhausen; Boy Cornils, Dinslaken, all of Germany

[73] Assignee: Ruhrchemie Aktiengesellschaft, Oberhausen, Germany

[22] Filed: June 18, 1975

[21] Appl. No.: 588,082

Related U.S. Application Data

[62] Division of Ser. No. 424,988, Dec. 14, 1973, Pat. No. 3,929,900.

[30] Foreign Application Priority Data

Dec. 27, 1972 Germany.............................. 2263498

[52] U.S. Cl................................ 23/285; 23/288 E; 23/288 K
[51] Int. Cl.²...................... B01J 8/08; C07C 45/10
[58] Field of Search.......... 23/288 K, 288 E, 288 R, 23/283, 285

[56] References Cited
UNITED STATES PATENTS

| | | | |
|---|---|---|---|
| 2,995,612 | 8/1961 | Hervert.......................... | 23/288 E X |
| 3,694,169 | 3/1972 | Fawcett et al. ................ | 23/288 K X |
| 3,721,530 | 3/1973 | Bouchet........................ | 23/288 E X |
| 3,723,545 | 3/1973 | Nagel et al..................... | 23/288 E X |
| 3,910,771 | 10/1975 | Chapman et al.................. | 23/288 E |

Primary Examiner—Morris O. Wolk
Assistant Examiner—Michael S. Marcus
Attorney, Agent, or Firm—Burgess, Dinklage & Sprung

[57] ABSTRACT

An improvement in a process of forming an aldehyde or alcohol by the Oxo process wherein an olefinically unsaturated hydrocarbon is reacted with carbon monoxide and hydrogen in the presence of a group VIII B catalyst which improvement involves introducing the olefinically unsaturated hydrocarbon, hydrogen and carbon monoxide together with the catalyst into the bottom of a first reaction zone, allowing the reactants to rise in said reaction zone, passing liquid reactants from the top of said first reaction zone into the top of a second reaction zone, withdrawing liquid reaction mixture from the bottom of the second reaction zone and withdrawing gaseous reactants from the second reaction zone.

3 Claims, 3 Drawing Figures

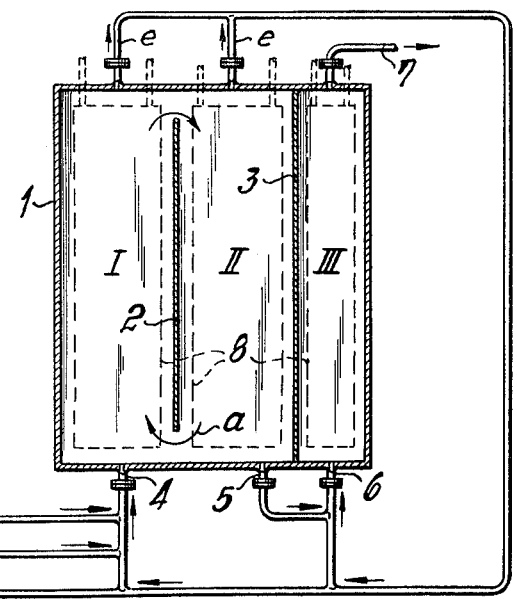
FIG. 1
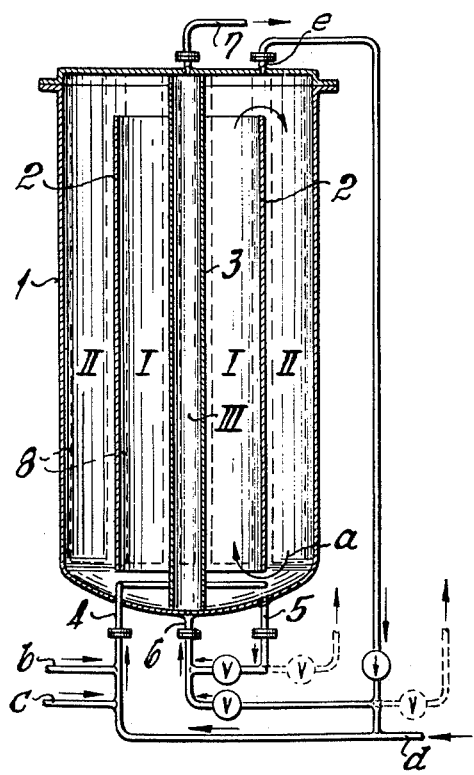
FIG. 2
FIG. 3

REACTOR FOR THE PRODUCTION OF OXYGEN CONTAINING COMPOUNDS

This is a division of application Ser. No. 424,988, filed Dec. 14, 1973 now U.S. Pat. No. 3,929,900,

BACKGROUND OF THE INVENTION

Field of the Invention

This invention is directed to a process for the production of oxygen containing compounds according to the Oxo-synthesis by reaction of olefinically unsaturated hydrocarbons with carbon monoxide and hydrogen, the reaction being carried through in a reaction system consisting of at least two separate reaction zones, preferably three reaction zones. This invention is particularly concerned with a process which increases the reaction selectivity by forming greater amounts of aldehyde and decreasing the amount of unreacted olefinically unsaturated hydrocarbon. This invention is particularly directed to a reaction system wherein the temperature of the reactants is maintained at an even level through the process.

DISCUSSION OF THE PRIOR ART

The addition of carbon monoxide and hydrogen on olefins at elevated pressures and temperatures under catalytic influence of carbonyl compounds of metals of group VIII B of the periodic table proceeds with high heat-development, causing a remarkable increase of the temperature along the reaction space which can lead to local overheating, unless the heat of reaction is not removed by adequate measures. Too high temperatures in the reactor cause the decomposition of the metal carbonyls used as catalysts and moreover result in undesired consecutive reactions of the aldehydes obtained as main products.

Hitherto numerous processes for improving the removal of the heat of reaction have been developed in order to attain a uniform temperature distribution over the entire length of the reaction vessel and to limit the decomposition of the catalyst and the occurence of consecutive reactions.

From German Pat. No. 926,846 it is known to provide for an intensive contact of the reactants in reactions between gases and/or vapors and liquids, especially under elevated pressure, by coaxially inserting a tube into the reaction space and injecting the gaseous, and/or vaporous and/or the liquid reactants into the interior of said tube, resulting in a rapid circulation of the reaction mixture upward in the interior of the coaxial tube and down in the surrounding annular exterior space. This method of proceeding results in a uniform reaction temperature all over the reaction vessel and a uniform course of the reaction. By proceeding in this manner, the removal of heat encounters difficulties only in respect of processes characterized by extremely high evolution of heat. In this process, no removal of heat by means of cooling surfaces is provided but the heat of reaction is removed by addition of cold or only slightly preheated starting materials and/or cooled liquid reaction products to the liquid flowing down in the space between the interior tube and the surrounding exterior walls of the reaction vessel, preferably at a level remote from the main entrance point of the starting materials.

Another method is described in German Auslegeschrift 1,085,144. In this process the Oxo-synthesis is effected in parallelly arranged tubes being connected at the bottom and at the top, the liquid rising in the reaction tube without auxiliary mechanical aids and descending outside thereof, and amount of reaction product corresponding to the amount of olefin and surplus gas being drained off at the top of the reaction tube by overflow. The jackets of reaction tube and return pipe are cooled. The reaction gases are introduced into the lower part of the reaction tube with high load, causing rapid circulation of the liquid reaction products resulting in a practically uniform temperature distribution in the entire reaction system.

According to the Oxo-synthesis process for the preparation of aldehydes described in German Auslegeschrift 1,135,879, only a part of the carbon monoxide/hydrogen mixture is directly introduced into the Oxo-reaction zone, the remainder being charged in a catalyst formation zone with cobalt carbonyl compounds under a pressure ranging about 40 atmospheres above the pressure prevailing in the synthesis reactor and introduced into the reactor.

In another continuous process for the preparation of oxygen containing compounds by the Oxo-reaction, the synthesis gas is completely dissolved in the liquid olefins under adequate pressure, the resulting reaction liquid being circulated (German Auslegeschrift 1,003,708).

The German Auslegeschrift 1,205,514 is directed to a process for the continuous preparation of oxygen containing compounds by the Oxo-synthesis in a circulation system, at least the liquid reactants being jointly or separately introduced with high velocity into the circulation system.

According to German Offenlegungsschrift 1,938,102, the reactants of an Oxo-synthesis process are introduced into a mixing zone provided in the reactor, having the 2 to 50-fold mean diameter of the introduced jet of the reactants, the length of the mixing zone amounting to the 3 to 30 fold of its hydraulic diameter.

In some different known Oxo-processes, the reaction is performed without means for increasing the flow velocity and improving the admixture of the reactants, as for instance the hereinbefore mentioned inside tubes or circulating devices, in long cyclindrical reactors provided with incorporated cooling systems, as conventionally used in heat exchangers, formed of vertically arranged cooling tubes being spaced apart by several guide means spaced over the length of the reactor.

In the hereinbefore mentioned reaction systems, the reactants are introduced at the bottom or at different levels of the reactor, the liquid reaction product being discharged at the head of the reactor.

These known processes indeed assure a satisfactory removal of heat, but they are disadvantageous due to the poor efficiency of the conversion of the starting olefins.

The reaction between the starting materials, i.e., olefin, hydrogen and carbon monoxide is effected in solution, preformed Oxo-reaction product being used as solvent. Thus, a considerable amount of dissolved olefin is discharged with the raw product from the reactor and is lost for the conversion.

It has therefore become desirable to provide an improvement in the Oxo-process in which the olefin product, the olefin reactant, is not lost during the process, but is virtually quantitatively converted to the aldehyde or alcohol product. More specifically, it has become desirable to provide a process in which the amount of unreacted olefin does not exceed 2%. Particularly, it has become desirable to provide a process in which the unreacted olefinically unsaturated hydrocarbon amounts to less than 1% of the amount charged. Similarly, it has become desirable to provide a process in which the heat formed during the reaction is dissipated and the preparation of undesirable side reaction products is minimized. It has become particularly desirable to provide a process in which the liquid and/or gaseous components of the process are passed through a reaction zone in a turbulent manner whereby the reactants become in intimate contact with one another. It has become particularly desirable to provide such a process by utilizing the reactants themselves as a source of the turbulence.

SUMMARY OF THE INVENTION

The long felt desires in this field are satisfied by an improved process of forming an aldehyde and/or alcohol by the Oxo-process wherein an olefinically unsaturated hydrocarbon is reacted with carbon monoxide and hydrogen in the presence of a group VIII B catalyst which improvement comprises introducing said olefinically unsaturated hydrocarbon, said hydrogen, said carbon monoxide and said catalyst into the bottom of a first reaction zone and allowing the reactants to rise in said reaction zone, passing liquid reactants from the top of said first reaction zone into the top of a second reaction zone, withdrawing liquid reaction mixture from the bottom of said second reaction zone and withdrawing gaseous reactants from said second reaction zone.

The process of the present invention is generally conducted by removing a portion of the gaseous reactants from the top of the first reaction zone and reintroducing a portion of said gases into the bottom of the first reaction zone, thereby facilitating the turbulent flow of the reaction components through the first and second reaction zone and increasing the circulation velocity of the reactants in the first and second reaction zone.

The present invention is desirably conducted utilizing a third reaction zone in series with the first and second reaction zone. In the third reaction zone liquid reaction mixture from the second reaction zone enters either the top or the bottom of the third reaction zone. The third reaction zone can be carried out either with cocurrent or countercurrent flow of gaseous carbon monoxide and hydrogen. If the carbon monoxide and hydrogen are to pass in cocurrent flow with liquid reactants containing olefinically saturated hydrocarbon the process is conducted by feeding liquid reaction mixture from the second reaction zone into the bottom of the third reaction zone and withdrawing liquid product from the top of the third reaction zone. If the process is to be conducted such that countercurrent flow exists in the third reaction zone, the liquid reaction mixture from the second reaction zone is introduced at the top of the third reaction zone and flows downwardly against upwardly flowing carbon monoxide and hydrogen. Hence, the carbon monoxide and hydrogen flow in countercurrent flow to the downwardly falling liquid reaction mixture.

The process is generally conducted by withdrawing gaseous reactants from the top of both the first and the second reaction zone. These withdrawn gases are recirculated to the first reaction zone. If a third reaction zone is employed a portion of the gases withdrawn from the first and second reaction zone is introduced into the third reaction zone and the balance thereof is recirculated to the first reaction zone.

Preferably each reaction zone has its reactant temperature controlled by the use of indirect heat exchange wherein cooling tubes are maintained in the reaction zone through which a cooling fluid is passed. This maintains the temperature of the reactants substantially uniform through the entire process and minimizes the extent to which side reactions occur. Since the process does not require the use of preformed reaction product as a solvent for the reactants virtually all of the olefinically unsaturated hydrocarbon partakes in the Oxo-reaction.

The present process is considered to be particularly surprising because although the gaseous phase is separated and discharged at the top of the first or second reaction zone, the conversion between olefin, dissolved hydrogen and carbon monoxide in the liquid phase in the second reaction zone is not hindered. Specifically even though the undissolved carbon monoxide and hydrogen are withdrawn from the first and/or second reaction zone the olefin reacts virtually quantitatively with the carbon monoxide and hydrogen to the second reaction zone to provide a product in which the unreacted olefin content is remarkably low.

If the reaction product is discharged at the bottom of the second reaction zone, a considerably higher efficiency of the conversion of the starting olefin is obtained as compared with the discharge of the reaction product at the top of a reactor, having a reaction space of equal size and consisting of one or two reaction zones. Residual olefin can be converted by the use of a generally smaller reaction zone constituting a third reaction zone even though the reactants are present therein in a considerably lower concentration then they are present in the two preceding reaction zones. Moreover, the process according to the invention provides a high selectivity of the reaction with respect to the formation of alcohols and aldehydes respectively.

BRIEF DESCRIPTION OF DRAWINGS

The present invention can be more readily understood and appreciated when reference is made to the accompanying drawings in which:

FIG. 1 is a sectional side elevation of an apparatus in which the process of the present invention can be conducted;

FIG. 2 is a sectional side elevation of another apparatus of the present invention in which the process of the present invention can be conducted; and FIG. 3 is a side elevation of a prior art type reactor employed for the preparation of aldehydes and/or alcohols by the Oxo-process.

DESCRIPTION OF SPECIFIC EMBODIMENTS

Referring to the drawings, into reaction zone I there is introduced olefinically unsaturated hydrocarbon b, Oxo-catalyst c and synthesis gas comprising carbon monoxide and hydrogen. These three materials enter reaction zone I through line 4. A liquid exists in reaction zone I. The liquid and gaseous reactants rise in reaction zone I and gaseous reactant is withdrawn at e at the top of reaction zone I. Liquid reaction mixture passes from the top of reaction zone I into the top of reaction zone II, these zones being separated by a baffle plate 2. Circulating liquid phase a can re-enter reaction zone I at the bottom thereof as shown in FIG. 1. Gaseous undissolved reactants are withdrawn from reaction zone II at the top thereof and joined with gaseous reactants from reaction zone I and are recirculated to reaction zone I through a line as shown. Preferably the reactor is equipped with a third, but smaller reaction zone, reaction zone III. When the process is conducted by use of the third reaction zone, liquid reaction mixture is withdrawn from reaction zone II through line 5 and introduced into the bottom of reaction zone III together with recycled carbon monoxide and hydrogen. The mixture of the liquid components, carbon monoxide and hydrogen together with catalyst pass cocurrently in reaction zone III and are removed in conduit 7. The products are then separated by conventional means.

The heat of reaction formed during the process is dissipated by the use of indirect heat exchange cooling means. Coils equipped with a cooling fluid are maintained in the reaction zones, these coils being represented by reference numeral 8. The coils are suspended in the reaction zones in such a manner as to minimize the flow resistance of the reactants as they pass through the zones.

Referring to FIG. 2 a preferred device for performing the novel process is shown. In FIG. 2 the zones are maintained coaxially with respect to one another. Olefin b, catalyst c and synthesis gas d are introduced into the bottom of the apparatus having exterior walls 1 through line 4, intermixed in the region below the cylindrical wall 2 and pass upwardly in reaction zone I. Liquid reactants flow from reaction zone I into reaction zone II by passing over the top of walls or baffle 2 thereby entering reaction zone II defined by the exterior wall 1 and cylindrical wall 2. Undissolved synthesis gas is removed at e and is recirculated partially through line 4 and partially through line 6 which feeds liquid reaction mixture and synthesis gas into reaction zone III. Liquid product is withdrawn from the bottom of reaction zone II through line 5 and passes by way of a valve into line 6 where it intermixes with recycling synthesis gas. The synthesis gas and liquid reactants from reaction zone II pass cocurrently in reaction zone III and are withdrawn together in conduit 7. The apparatus of FIG. 2 is similarly equipped with recirculating tubes of cooling fluid, these tubes being represented by reference numeral 8.

The process is conducted utilizing an apparatus wherein the first reaction zone comprises 20 to 60%, preferably 25 to 35% of the entire volume of the first and second reaction zones. If a third reaction zone is employed, it has a volume of 3 to 15%, preferably 5 to 10% of the entire volume of the first and second reaction zones. The chambers are provided with an incorporated cooling system in order to take off the heat of the reaction. The two first chambers are connected at the top and at the bottom in such a manner that a circulation of the reaction mixture is developed. Variable flow conditions prevail in the different chambers and the entering reactants are of different composition. As indicated above, gaseous and liquid phases are separated at the top of the first and/or second reaction zones. The liquid flows in the second reaction zone from the top to the bottom. From the bottom of the second reaction zone, the main portion of the liquid phase flows back to the first reaction zone. An amount of reaction product corresponding to the converted olefin is discharged from the reactor or, preferably, is introduced into a third reaction zone.

The circulation of the reaction product between the first and the second reaction zone is caused by the lower specific gravity of the synthesis gas and the olefin in comparison to that of the reaction product, introduced into the first reaction zone as well as by the kinetic energy of the introduced components.

A partial current of the gaseous phase being discharged from the reactor at the top of the first and/or second reaction zone amounting to about 10 to 100%, preferably 20 to 40%, of the amount of the fresh synthesis gas is recirculated to the bottom of the first reaction zone and increases the circulation velocity of the reactants in the first and the second reaction zone. The remainder of the gas being discharged from the first and/or second zone of the reactor is bleeded off or, in the preferred embodiment of the invention comprising three reaction zones, introduced into the third reaction zone. The third reaction zone is passed in cocurrent or countercurrent flow by the hereinbefore mentioned residual partial current of the gaseous phase and the part of the liquid phase being discharged from the second reaction zone but not recirculated to the first zone. According to a preferred embodiment of the invention, gaseous and liquid phase pass cocurrently from the bottom to the top of the third reaction zone.

In practicing the process of the invention, it is most advantageous to use cooling systems comprising vertically arranged cooling tubes being spaced apart by supporting devices exerting low flow resistance to the circulation and prevent as fast as possible eddying of the reaction mixture. For instance, two or several cooling tubes respectively may be connected by short spacers being welded thereupon in adequate distances in flow direction. The minimization of flow resistance due to the cooling means is an important consideration as it is desired to maintain a high velocity and selectivity for the reaction.

Although it might have been expected that a greater circulation of reactants would have developed and a better heat transmission would have occurred by using spacers having a low flow resistance, it could not have been predicted that the velocity and selectivity of the reaction would also be improved. This improvement is due to the effects of the specific process scheme as outlined above, including the withdrawal of synthesis gas from the first and/or second reaction zone. The minimization of low flow resistance by the use of appropriately arranged spacers can be affected by disposing the spacers linearly in the path of reactant flow whereby the reactants continue to flow at substantially the same velocities as they would flow had no such spacers been disposed in the chambers.

The higher inherent turbulence of the circulating liquid stream causes an acceleration of the conveying operations determining the reaction velocity, so that a similar volume-time conversion is attained at lower temperatures as compared with the use of spacers opposing a higher resistance to the parallel flow with respect to the cooling tubes. The lower reaction temperature provides a higher yield of normal aldehydes and a lower formation of by-products. Additionally, the formation of higher boiling consecutive products such as thick oils is markedly reduced due to the fact that formation of the spacers according to adequate flow line patterns results in preventing undesired whirling, which can cause undefined retention times for the product.

The cooling system represented by reference numeral 8 is advantageously charged with circulating or evaporated water or different cooling media, as for instance, alcohols. The cooling medium flows at first through an interior tube, inserted into the proper cooling tube and subsequently through the annular space between the interior tube and the cooling tube, or, if desired, in inverse direction.

In order to more fully illustrate the nature of the invention and the manner of practicing the same the following examples are presented. In the examples the process of the present invention conducted with two and three reaction system wherein the reactor had substantially the same volume as the total volume for the reaction zones utilized in the claimed process.

EXAMPLES

EXAMPLE 1

Utilization of an Oxo-reactor of conventional design, consisting of a cylindrical pressure vessel having a diameter of 1200 mm. and a length of 12 m, provided with an inserted system of cooling tubes for the removal of heat of reaction. The reactor is shown in FIG. 3. The vertically arranged cooling tubes were disposed over the cross section of the reactor uniformly and were spaced apart in known manner by the use of several plates 9 arranged at right angles to the reactor axis, provided with perforations for the tubes. The reactants were introduced through line 4 into the reactor, reaction product and synthesis gas were discharged through line 7. Synthesis gas, catalyst and olefinically unsaturated hydrocarbon all entered the reactor through line 4.

EXAMPLE 2

The process was conducted employing the apparatus of FIG. 2 utilizing three reaction zones and the flow scheme was as described above.

EXAMPLE 3

The process was carried out in the reactor described in Example 2 but the third reaction zone was not employed. The liquid products were withdrawn from line 5 and recovered by the recovery system shown in dotted lines in FIG. 2. Gaseous reactants were withdrawn at e and recovered as shown in the dotted lined portion to the right of FIG. 2.

In each test the reactor was charged with 4300 kg/h of a propylene/propane mixture having a propylene content of 93%. The reactor was also charged with 5200 normal m³/h of synthesis gas containing 98% carbon monoxide and hydrogen in a ratio of 1:1. In the tests of Examples 2 and 3 1300 normal m³/h of residual synthesis gas obtained from the first reaction zone was jointly introduced with fresh synthesis gas into the first reaction zone.

The temperatures in the reaction space and the reaction products obtained in the three examples from 100 kg propylene respectively (calculated as 100%) are set forth in the table below. The process was operated employing a pressure in the reactor which amounted to 285 atm during the three tests.

| Example | 1 | 2 | 3 |
| --- | --- | --- | --- |
| Average temperature in the °C | | | |
| reaction space | 141 | — | — |
| in chamber I | — | 136 | 136 |
| in chamber II | — | 135 | 135 |
| in chamber III | — | 137 | — |
| reaction product in kg/100 kg propylene | | | |
| n-butyraldehyde | 104.8 | 112.8 | 111.9 |
| i-butyraldehyde | 27.3 | 28.8 | 28.6 |
| n-butanol, n-C₁-ester | 14.1 | 12.3 | 12.1 |
| i-butanol, i-C₁-ester | 6.6 | 5.7 | 5.7 |
| thick oil | 12.4 | 10.0 | 9.9 |
| propane | 1.9 | 2.0 | 2.0 |
| unreacted propylene | 3.1 | 0.3 | 1.1 |
| sum of entire product | 170.2 | 171.9 | 171.3 |

Several facts are apparent from the comparative data set forth in the table. By use of the device and process of the present invention, the temperature of the reactants can be maintained at least 4° below the temperature which prevails in the reactor of FIG. 3, the prior art type reactor. This means that the amount of by-products formed is substantially less. That fact is confirmed when one compares the amounts of thick oil obtained by the three processes. The amount of thick oil obtained by the present process is at least 2.4% less than obtained by the prior art process. The process is considerably more selective for the preparation of normal aldehydes. The processes of Examples 2 and 3 provided about 8% more normal aldehyde than was provided by the process of Example 1. Moreover, the process of the present invention is characterized by a greater conversion of the olefinically unreacted hydrocarbon. Whereas the reaction mixture obtained by Example 1 contained 3.1 wt.% of unreacted propylene the process of the present invention contained only 1.1 wt.% unreacted propylene for Example 3 and only 0.3 wt.% unreacted propylene for the process of Example 2. These results establish that by the use of a multi-zoned reactor and by the withdrawal of gaseous components from the first and/or second reaction zone and the recycling thereof, the process is improved by more efficiently removing the heat formed during the reaction, providing a higher reaction selectivity and providing a greater overall reactivity insofar as the propylene reactant is concerned.

What is claimed is:

1. A reactor for performing the Oxo-process which comprises a first generally cylindrical wall defining therewithin a first chamber, said first generally cylindrical wall having disposed thereabout an exterior housing to define a second chamber between a wall of said exterior housing and said first generally cylindrical wall, said exterior housing comprising side walls, a top wall, a bottom wall, inlet and outlet means, said first generally cylindrical wall being spaced from the walls of said housing to define an upper region above said first and second chambers and a lower region beneath said first and second chambers, said first and second chambers being in fluid communication with one another above and below said first cylindrical wall through said upper and lower regions, said first chamber having disposed therethrough a tabular conduit that interconnects with and is closed by the top and bottom walls of said reactor, said tubular conduit, top and bottom walls forming a third chamber therebetween and having inlet and outlet means at opposite ends thereof and conduit means connecting and communicating the outlet means of said housing with the inlet means of said third chamber and said housing.

2. a reactor according to claim 1 wherein the vertical axis of said reactor is parallel to said first cylindrical wall and said conduit means connects said lower region with the bottom of said third chamber and said outlet means of said third chamber is connected to the top of said third chamber.

3. A reactor according to claim 1 wherein said first, said second and said third chambers contain therewithin cooling coils in indirect heat exchange with material contained in said chambers.

* * * * *